United States Patent
Zhao (10) Patent No.: US 12,192,413 B2
(45) Date of Patent: Jan. 7, 2025

(54) METHOD OF ENSURING VOICE OVER INTERNET PROTOCOL RELIABILITY AFTER ENTERING A POWER SAVING MODE

(71) Applicant: ARRIS Enterprises LLC, Suwanee, GA (US)

(72) Inventor: Michael Zhao, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 237 days.

(21) Appl. No.: 17/298,841

(22) PCT Filed: Jun. 28, 2020

(86) PCT No.: PCT/CN2020/098483
§ 371 (c)(1),
(2) Date: Jun. 1, 2021

(87) PCT Pub. No.: WO2022/000124
PCT Pub. Date: Jan. 6, 2022

(65) Prior Publication Data
US 2022/0311868 A1  Sep. 29, 2022

(51) Int. Cl.
*H04M 7/00* (2006.01)
*H04L 65/10* (2022.01)
*H04L 67/145* (2022.01)

(52) U.S. Cl.
CPC ...... *H04M 7/0084* (2013.01); *H04L 65/1013* (2013.01); *H04L 67/145* (2013.01); *H04M 7/006* (2013.01); *H04M 7/0081* (2013.01)

(58) Field of Classification Search
CPC .. H04M 7/006; H04M 7/0081; H04M 7/0084; H04L 67/145; H04L 65/1013
See application file for complete search history.

(56) References Cited

U.S. PATENT DOCUMENTS 9,345,060 B1 * 5/2016 Ramamurthy ........ H04W 76/18
10,098,041 B2  10/2018 Vallabhu et al.
2007/0250605 A1 * 10/2007 Duchene ............ H04L 41/0853
    709/223

(Continued)

FOREIGN PATENT DOCUMENTS

| CN | 1731741 | 2/2006 |
|---|---|---|
| CN | 107005896 | 8/2017 |
| EP | 2 838 295 | 2/2015 |

OTHER PUBLICATIONS

International Search Report & Written Opinion of the International Searching Authority issued Mar. 17, 2021 in International Application No. PCT/CN2020/098483.

*Primary Examiner* — Nam T Tran
(74) *Attorney, Agent, or Firm* — Wenderoth, Lind & Ponack, L.L.P.

(57) ABSTRACT

A method is provided for causing a networking device to enter a power saving mode, determining whether or not a Voice over Internet Protocol (VOIP) telephony interface is in service after the causing the networking device to enter the power saving mode, the networking device including the VOIP telephony interface, the VOIP telephony interface communicatively connected to a VOIP provider, and rebooting the networking device when the VOIP telephony interface is determined not to be in service.

19 Claims, 4 Drawing Sheets

(56) References Cited

U.S. PATENT DOCUMENTS

| | | | |
|---|---|---|---|
| 2009/0003319 A1* | 1/2009 | Sood | H04L 12/66 |
| | | | 370/352 |
| 2012/0278542 A1* | 11/2012 | Liu | G06F 1/3287 |
| | | | 711/E12.008 |
| 2015/0078373 A1* | 3/2015 | Roberts | H04L 67/306 |
| | | | 370/352 |
| 2016/0183144 A1 | 6/2016 | Vallabhu et al. | |

* cited by examiner

METHOD OF ENSURING VOICE OVER INTERNET PROTOCOL RELIABILITY AFTER ENTERING A POWER SAVING MODE

BACKGROUND

1. Technical Field

The subject matter of the present disclosure relates generally to a method of ensuring Voice over Internet Protocol (VOIP) reliability after a networking device enters a power saving mode.

2. Description of the Related Art

VOIP is technology that allows voice communication over a data network. In a traditional VOIP system, an analog telephone is connected via registered jack (RJ) to an analog telephone adaptor (ATA). The ATA performs a function of converting analog telephony signals from the analog telephone into data packets capable of transmission over the Internet. The ATA then transmits the data packets to a networking device, such as a modem, connected to the ATA via wired or wireless connection for transmission over the Internet to a VOIP provider. The VOIP provider processes the data packets received from the networking device, and interfaces with the public switched telephone network (PSTN) to appropriately route telephony data to the intended destination.

The VOIP provider additionally receives telephony call data from the PSTN, and forwards the data packets to the networking device via the Internet. The ATA converts data packets received from the networking device into analog telephony signals and provides the analog telephony signals to the analog telephone via RJ.

By the above-noted processes, the ATA, networking device, and VOIP provider establish a voice line for a telephone call between the analog telephone connected to the ATA and another device connected to the PSTN.

More recently, many networking devices have implemented the ATA as software embedded in the networking device, e.g., an embedded multimedia terminal adaptor (eMTA). In such a configuration, the networking device includes a capability for connecting with an analog telephone via RJ and software for converting analog telephony signals into data packets capable of transmission over the Internet and/or converting data packets received over the Internet into analog telephony signals, thereby eliminating the need for a standalone ATA.

VOIP is not limited to implementation using an analog telephone. For example, electronic devices, such as smartphones, digital telephones, and home computers, may also be configured with software that allows the electronic device to act as a phone to receive analog telephony signals, convert the analog telephony signals into data packets capable of transmission over the Internet, and forward the data packets to a networking device.

There exists a problem that VOIP may be unreliable in the event of a networking device entering a power saving mode. For example, because a networking device with an eMTA relies primarily on externally supplied power, there exists a problem that VOIP may be unreliable in the event of interruption of the externally supplied power. This is particularly a problem if a user is attempting to use VOIP for making a voice call to emergency services. Accordingly, a method of ensuring VOIP reliability after the networking device enters a power saving mode is desired.

BRIEF SUMMARY

According to an aspect of the present disclosure, a networking device is provided, including a processor, a Voice over Internet Protocol (VOIP) telephony interface configured to communicate with the processor, and a non-transitory memory having software stored thereon, which when executed, cause the processor to direct the networking device to enter a power saving mode, determine whether or not the VOIP telephony interface is in service after the networking device entered the power saving mode, the VOIP telephony interface being communicatively connected to a VOIP provider, and reboot the VOIP telephony interface when the VOIP telephony interface is determined to not be in service.

According to another aspect of the present disclosure, a method is provided for causing a networking device to enter a power saving mode, determining whether or not a Voice over Internet Protocol (VOIP) telephony interface is in service after causing the networking device to enter the power saving mode, the networking device including the VOIP telephony interface, the VOIP telephony interface communicatively connected to a VOIP provider, and rebooting the networking device when the VOIP telephony interface is determined not to be in service.

According to another aspect of the present disclosure, a non-transitory computer readable recording medium is provided. The non-transitory computer readable recording medium having stored thereon executable instructions, which when executed, cause a processor to perform causing a networking device to enter a power saving mode, determining whether or not a Voice over Internet Protocol (VOIP) telephony interface is in service after causing the networking device to enter the power saving mode, the networking device including the VOIP telephony interface, the VOIP telephony interface communicatively connected to a VOIP provider, and rebooting the networking device when the VOIP telephony interface is determined not to be in service.

As will be described below by way of example, the present disclosure provides an technique of ensuring VOIP reliability after a networking device enters a power saving mode, thereby ensuring that a user will be able to place a voice call for emergency services using VOIP in the event of that the networking device is in the power saving mode.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
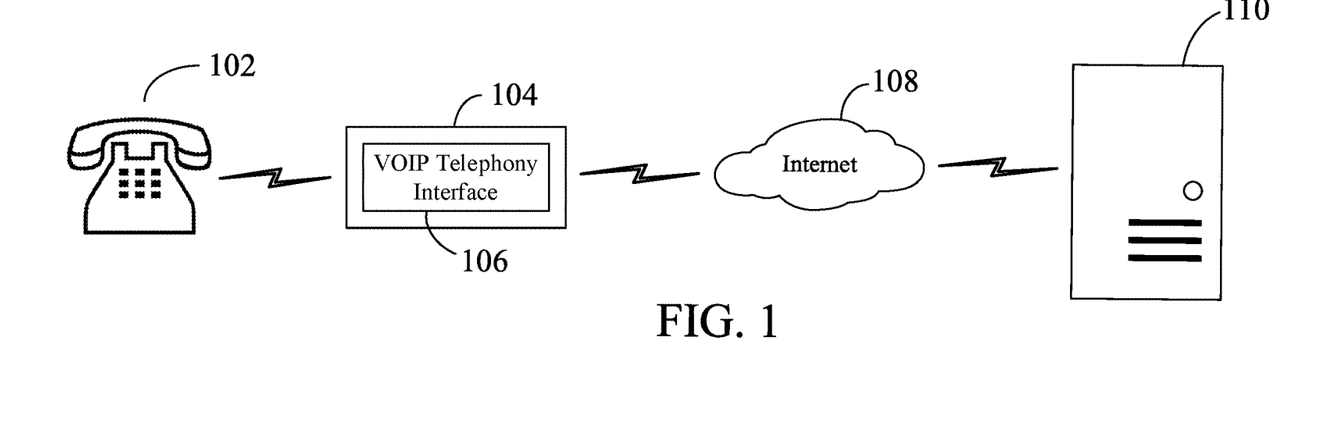
FIG. 1 illustrates an exemplary diagram of a system in which an exemplary a method of ensuring VOIP reliability after the networking device enters a power saving mode is implemented according to an aspect of the present disclosure.

FIG. 1 illustrates an exemplary diagram of a system in which a method of ensuring VOIP reliability after an interruption in power to a networking device is implemented according to an aspect of the present disclosure.

As illustrated in FIG. 1, the system includes a telecommunications device 102, a networking device 104, and a server 110, where the network device 104 facilitates communication between the telecommunications device 102 and the server 110 via the Internet 108 to establish a voice line for communication between the telecommunications device 102 and another device connected to the PSTN.

The telecommunications device 102 may be any system or device capable of making and receiving telephone calls. Telecommunications device 102 may run software that allows the telecommunications device 102 to act as a telephone to receive analog telephony signals, and communicate the received analog telephony signals to the networking device 104. Non-limiting examples of the telecommunications device 102 include a traditional wired telephone, a cordless telephone, and other similar telecommunication devices. The present disclosure contemplates that more than one telecommunications device 102 may be a part of the system as illustrated in FIG. 1.

The networking device 104 may be any system or device capable of facilitating communication between the telecommunications device 102 and server 110 via Internet 108 to establish a voice line for communication utilizing VOIP. The networking device 104 includes a VOIP telephony interface 106 performing operations of an embedded multimedia terminal adaptor. More specifically, the VOIP telephony interface 106 may be configured for receiving analog telephony signals directly from the telecommunications device 102, converting the analog telephony signals into data packets capable of transmission over the Internet 108, and forwarding the data packets to the server 110 via the Internet 108. Additionally, the VOIP telephony interface 106 may be configured for receiving data packets from the server 110 via the Internet 108, converting the received data packets into analog telephony signals, and providing the analog telephony signals to the telecommunications device 102. The VOIP telephony interface 106 may be implemented in the networking device 104 as hardware, software, or a combination thereof for enabling the operations of the VOIP telephony interface 106 described herein.

Further, the networking device 104 may be any system or device capable of performing processing for ensuring VOIP reliability after the networking device 104 enters a power save mode in accordance with the aspects of the present disclosure described herein. Non-limiting examples of the networking device 104 include an embedded multimedia terminal adapter, a cable modem, a router, a gateway, and other similar computer devices.

When receiving analog telephony signals from or providing analog telephony signals to the telecommunications device 102, for example when the telecommunications device 102 is an traditional wired telephone, the VOIP telephony interface 106 of the networking device 104 may communicate with the telecommunications device 102 via registered jack (RJ) such as RJ11, RJ13, and RJ25 telephone connections.

The server 110 may be any system or device capable of transmitting and/or receiving data packets from the networking device 104 in accordance with the aspects of the present disclosure described herein. More specifically, the server 110 may be any system or device provided by a VOIP provider or multiple-system operator (MSO) capable of receiving, processing, and forwarding data packets received from the VOIP telephony interface 106 of the networking device 104 to a computing device for interfacing with the PSTN. Additionally, the server 110 may be any system or device provided by a VOIP provider or MSO capable of receiving, processing, and forwarding data packets received from the PSTN to the VOIP telephony interface 106 of the networking device 104. Non-limiting examples of the server 110 include a web server, an application server, a database server, and other similar computing devices. Further, the present disclosure contemplates that server 110 may be a cloud server running in a cloud computing environment.

The networking device 104 and the server 110 communicate via the Internet 108 using wired or wireless connections to allow communication via a broadband access link, such as a DOCSIS, PON, fixed wireless or DSL connection.

The server 110 may be configured to directly interface with the PSTN without an intermediary computing device. Server 110 communicates telephony signals including digitized voice to and from the PSTN. Server 110 also manages information about the VOIP terminals so that a call from the PSTN to a specific VOIP terminal is routed correctly, such as whether the VOIP terminal is in service or out of service.

Figure 2:
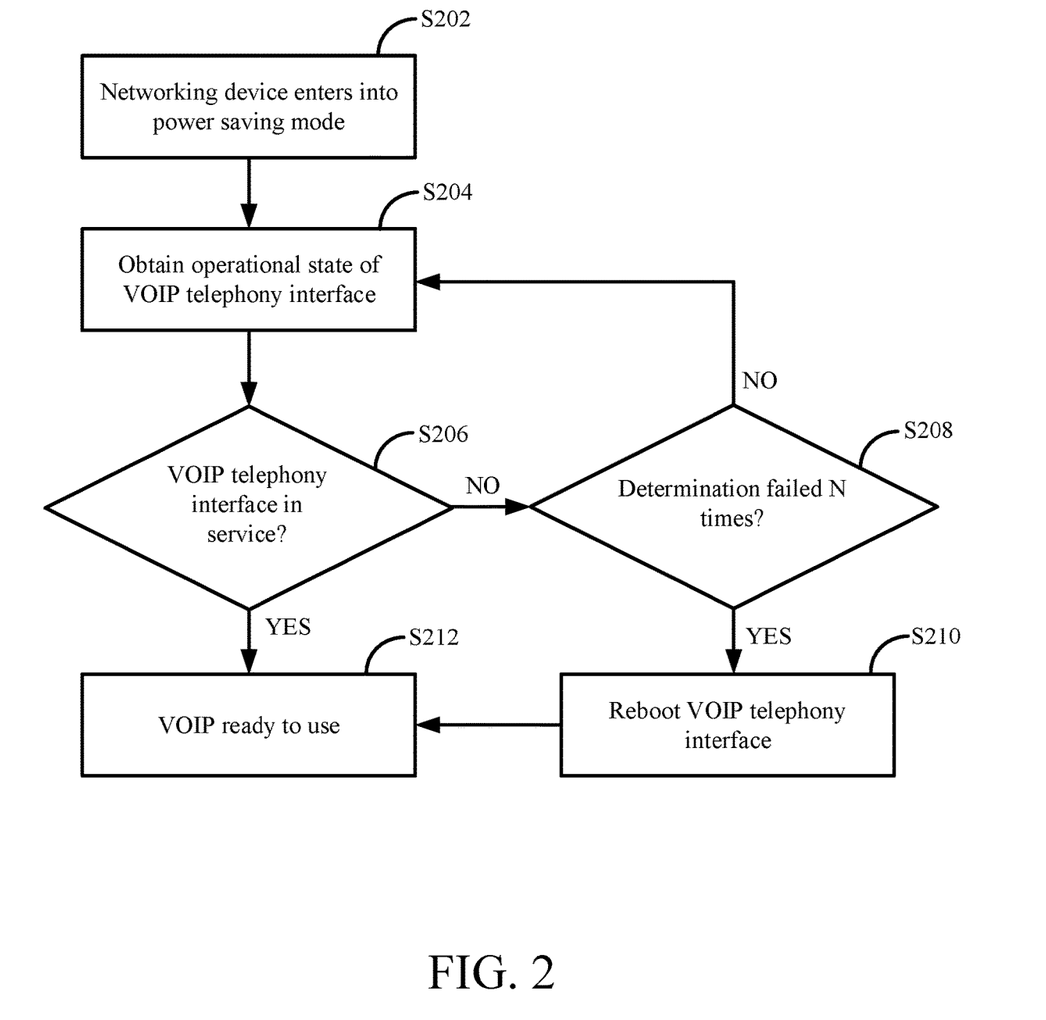
FIG. 2 illustrates an exemplary method of ensuring VOIP reliability after the networking device enters a power saving mode according to an aspect of the present disclosure.

FIG. 2 illustrates an exemplary method of ensuring VOIP reliability after entry of a networking device into a power saving mode.

At Step S202, the networking device 104 enters into a power saving mode. According to an embodiment of the present invention, the networking device 104 is supplied DC electrical power, which is converted from AC electrical power received from an AC mains. In such a case, a detection circuit may be integrated into the networking device 104 to detect when a DC voltage input to the networking device 104 falls below a predetermined threshold. e.g., the detection circuit may be configured to detect when the DC voltage falls below a threshold of 10.8 V, and when the DC voltage falls below this threshold, the detection circuit sends a signal to a controller of the networking device 104 signifying interruption of the power supplied the networking device 104. Upon receipt of the signal, the controller may place the networking device 104 into a power saving mode.

When operating in the power saving mode in the event of interruption of power to the networking device 104, the networking device 104 is configured to operate on battery power utilizing an internal battery in the event of interruption of power to the networking device 104. In order to operate on battery power as long as possible, the networking device 104 may reduce a number of transmit and receive channels. For example, under normal operation according to Data Over Cable Service Interface Specification (DOCSIS) standards, e.g., DOCSIS 3.0 or DOCSIS 3.1, the networking device 104 bonds multiple transmit channels to send data at high speed and/or bonds multiple receive channels to receive data at high speed. However, this normal operation requires multiple transmitters and receivers of the networking device to be active.

In order to reduce power consumption, the networking device 104 may reduce the number of active transmitters and active receivers, that is, the networking device 104 may limit one transmit channel for sending data and one receive channel for receiving data, thereby reducing power demand of the networking device 104 and extending the life of the battery.

Further, in addition to reducing the number of active channels, the networking device 104 may shut down any residential network communication through the networking device 104 to further reduce the power consumption of the networking device. In other words, by shutting down the residential network communication through the networking device 104, the networking device 104 intends for the one active transmit channel and the one active reception channel to primarily be used by the VOIP telephony interface 106 for VOIP communication.

It should be understood that the present invention is not limited to the networking device 104 entering the power saving mode based on detection of an interruption of power to the networking device 104. For example, the networking device 104 may monitor upstream and downstream data traffic, and the networking device 104 may enter and exit the power savings mode based on the monitored data traffic. In the event that the monitored data traffic is below a threshold for a predetermined amount of time, e.g., a downstream rate of 1.5 Mbps and an upstream rate of 0.5 Mbps for 300 seconds, the networking device 104 may enter the power saving mode, in which the networking device 104 may limit one transmit channel for sending data and one receive channel for receiving data, thereby reducing power demand of the networking device 104. Subsequently, while in the power savings mode, the networking device 104 may exit the power savings mode in the event that the monitored data traffic is above a threshold for a predetermined time, e.g., a downstream rate of 2 Mbps and an upstream rate of 1 Mbps for 2 seconds.

At Step S204, the networking device 104 obtains an operational state of the VOIP telephony interface 106 indicating whether or not the VOIP telephony device 106 is operational. For example, as the operational state of the VOIP telephony interface 106, the networking device 104 may obtain a provisioning state of the VOIP telephony interface 106 indicating whether or not the VOIP telephony interface 106 has completed loading and processing of initialization parameters.

At Step S206, the networking device 104 makes a determination whether or not the VOIP telephony interface 106 is in service based on the obtained operational state of the VOIP telephony interface 106. For example, the networking device 104 may determine that the VOIP telephony interface 106 is in service when the obtained operational state indicates that the VOIP telephony interface 106 is operational, and the networking device 104 may determine that the VOIP telephony interface 106 is not in service when the obtained operational state does not indicate that the VOIP telephony interface 106 is operational.

In the case that the provisioning state of the VOIP telephony interface 106 is obtained as the operational state of the VOIP telephony interface 106, the networking device 104 may determine that the VOIP telephony interface 106 is in service when the obtained provisioning state indicates that the VOIP telephony interface 106 has completed loading and processing of initialization parameters, and the networking device 104 may determine that the VOIP telephony interface 106 is not in service when the obtained provisioning state does not indicate that the VOIP telephony interface 106 has completed loading and processing of initialization parameters. However, it should be understood that the present invention is not limited to determining whether or not the VOIP telephony interface 106 is operational based on the provisioning state of the VOIP telephony interface 106.

If the networking device 104 determines that the VOIP telephony interface 106 is in service ("YES" at Step S208), VoIP is ready to be used by the telecommunications device 102 at Step S212. The networking device 104 may provide an indication to the telecommunications device at Step S212 that VOIP is available and ready to be used. For example, the networking device 104 may transmit a dial tone to the telecommunications device 102 to signify that VoIP is available and ready to be used. Additionally, if the telecommunications device 102 includes a display, the networking device 104 may send a message displayable on the display of the telecommunications device 102 that VOIP is available and ready to be used.

If the networking device 104 determines that the VOIP telephony interface 106 is not in service ("NO" at Step S206), the networking device 104 then makes a determination at Step S208 if the determination of whether or not the VOIP telephony interface 106 is in service has failed a predetermined number ("N") times. The predetermined number may be selected so as to ensure that the VOIP telephony interface 106 is not in service. For example, the networking device 104 may certainly determine that the VOIP telephony interface 106 is not in service if the determination of whether or not the VOIP telephony interface 106 is in service has failed 3 times, that is, the predetermined number is 3.

If the networking device 104 determines that the determination of whether or not the VOIP telephony interface 106 is in service has not failed the predetermined number of times ("NO" at Step S208), the networking device 104 repeats the determination of whether or not the VoIP telephony interface 106 is in service at Step S204. The repeated determination of whether or not the VOIP telephony interface 106 is in service may be performed immediately or after a predetermined time delay.

On the other hand, if the networking device 104 determines that the determination of whether or not the VOIP telephony interface 106 is in service has failed the predetermined number of time ("YES") at Step S208, the networking device 104 performs a reboot of the VOIP telephony interface 106 at Step S210. As a result of rebooting, the networking device 104 obtains a configuration file, which provides the VOIP telephony interface 106 with the IP address of the server 110.

After obtaining the IP address of the server 110 from the configuration file, the VOIP telephony interface 106 transmits a registration request to the IP address of the server 110 in order to reestablish a connection to the server 110. The registration request transmitted by the VOIP telephony interface 106 provides information identifying a location of the VOIP telephony interface 106 to the server 110, for example, the information may identify an IP address and port number of the VOIP telephony interface 106 and/or an IP address and port number of the telecommunications device 102. Upon receiving registration confirmation from the server 110, the VOIP telephony interface 106 will have reestablished that VOIP is available and ready to be used by the telecommunications device 102 as a result of rebooting the VOIP telephony interface 106.

After rebooting the VOIP telephony interface 106 at Step S210, VOIP is ready to be used by the telecommunications device 102 at Step S212. The networking device 104 may provide an indication to the telecommunications device at Step S212 that VOIP is available and ready to be used. For example, the networking device 104 may transmit a dial tone to the telecommunications device 102 to signify that VoIP is available and ready to be used. Additionally, if the telecommunications device 102 includes a display, the networking device 104 may send a message displayable on the display of the telecommunications device 102 that VOIP is available and ready to be used.

Alternatively, instead of directly proceeding to Step S212 after rebooting the VOIP telephony interface 106, the networking device 104 may attempt to further perform a determination of whether the VOIP telephony interface 106 is in service to ensure that the VOIP telephony interface 106 is in service after rebooting the VOIP telephony interface 106 and only proceeding to Step S212 after a determination that the VOIP telephony interface 106 is in service. For example, instead of directly proceeding to Step S212 after rebooting the VOIP telephony interface 106 at Step S210, the method may return to Step S204 and the networking device 104 determines whether the VOIP telephony interface 106 is in service.

It should be understood that the above-described method illustrated in FIG. 2 may be implemented as any combination of an apparatus, a system, an integrated circuit, and a computer program on a non-transitory computer readable recording medium. Hardware components, e.g., one or more processors, of such a combination may be implemented as an integrated circuit (IC), an application specific integrated circuit (ASIC), or large scale integrated circuit (LSI), system LSI, super LSI, or ultra LSI components that perform a part or all of the features described herein.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 2. For example, the one or more memories stores software or algorithms with executable instructions and the one or more processors can execute a set of instructions of the software or algorithms in association the performing the features of the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

The term non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

Figure 3:
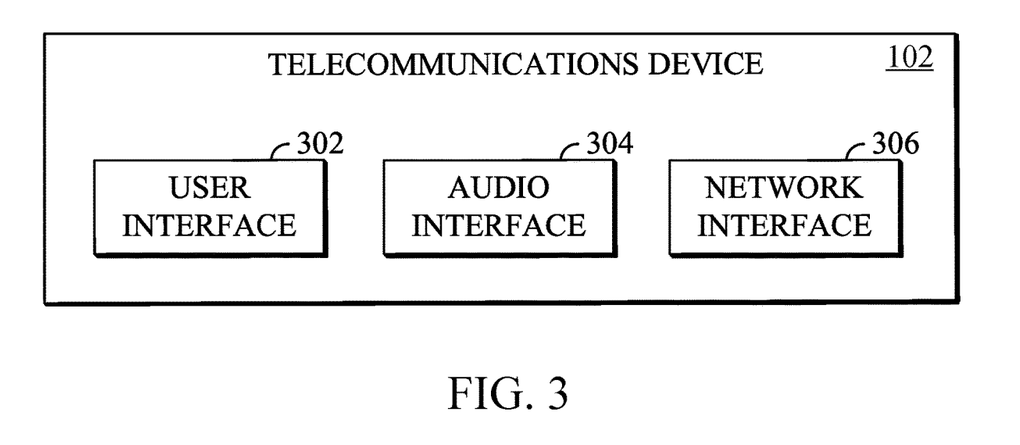
FIG. 3 illustrates a block diagram of an exemplary telecommunications device according to an aspect of the present disclosure.

FIG. 3 is a block diagram of an exemplary implementation of the telecommunications device 102 as a traditional wired telephone according to an aspect of the present disclosure. As previously discussed, the telecommunications device 102 is not limited to a traditional wired telephone, and the telecommunications device 102 may alternatively be a cordless telephone, a mobile device, a personal computer, a laptop, and other similar telecommunication devices.

As illustrated in FIG. 3, the exemplary telecommunications device 102 includes user interface 302 such as a keypad or the like for enabling the dialing a telephone number, an audio interface 304 such as a handset, headset, speaker, or the like for enabling two-way exchange of audio, and a network interface 306 such as a RJ connection for connecting the telecommunications device 102 to the networking device 104.

Figure 4:
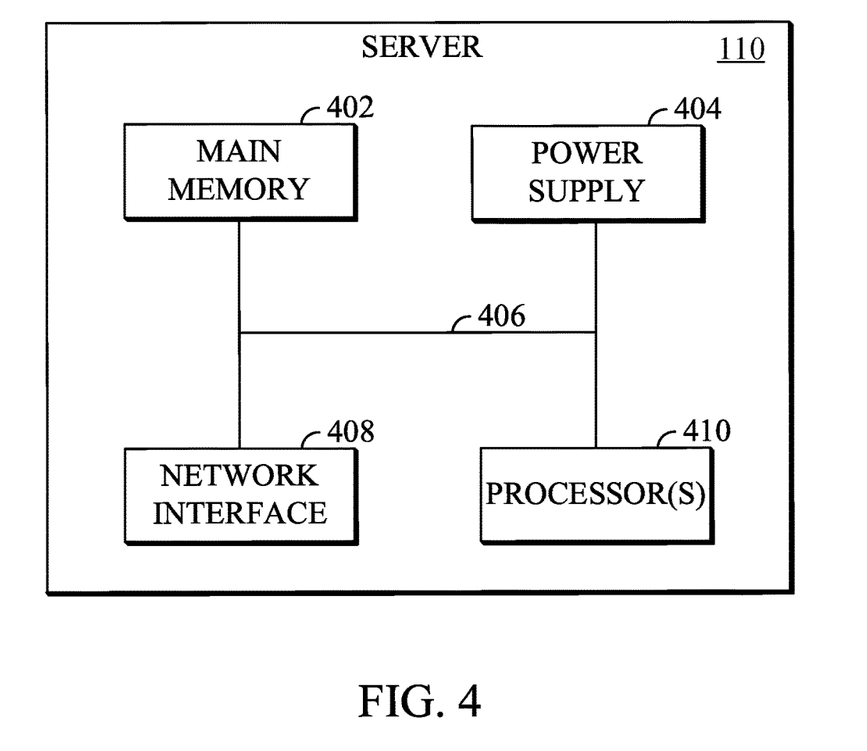
FIG. 4 illustrates a block diagram of an exemplary server according to an aspect of the present disclosure.

FIG. 4 is a block diagram of an exemplary implementation of server 110 according to an aspect of the present disclosure. It is contemplated by the present disclosure that the server 110 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As illustrated in FIG. 4, the exemplary server 110 includes one or more memories or memory locations including a main memory 402 as well as a power supply 404, a network interface 408, and one or more processors 410. The main memory 402 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 402 can be used to store any type of instructions associated with algorithms, processes, or operations for controlling the general functions of the server 110 including the operations of software as well as any operating system, such as Linux, UNIX, Windows Server, or other customized and proprietary operating systems.

The power supply 404 can be used to power the various components of the server 110. The power supply 404 can include an interface to be powered through an electrical outlet.

The network interface 408 is a software and/or hardware interface implemented to establish a connection between the server 110 and the networking device 104 according to one or more aspects of the present disclosure described above.

The one or more processors 410 are used for controlling the general operations of the server 110. Each one or the one or more processors 410 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the server 110. Communication between the components of the server 110 (e.g., 402, 404, 408, and 410) are established using an internal bus 406.

Figure 5:
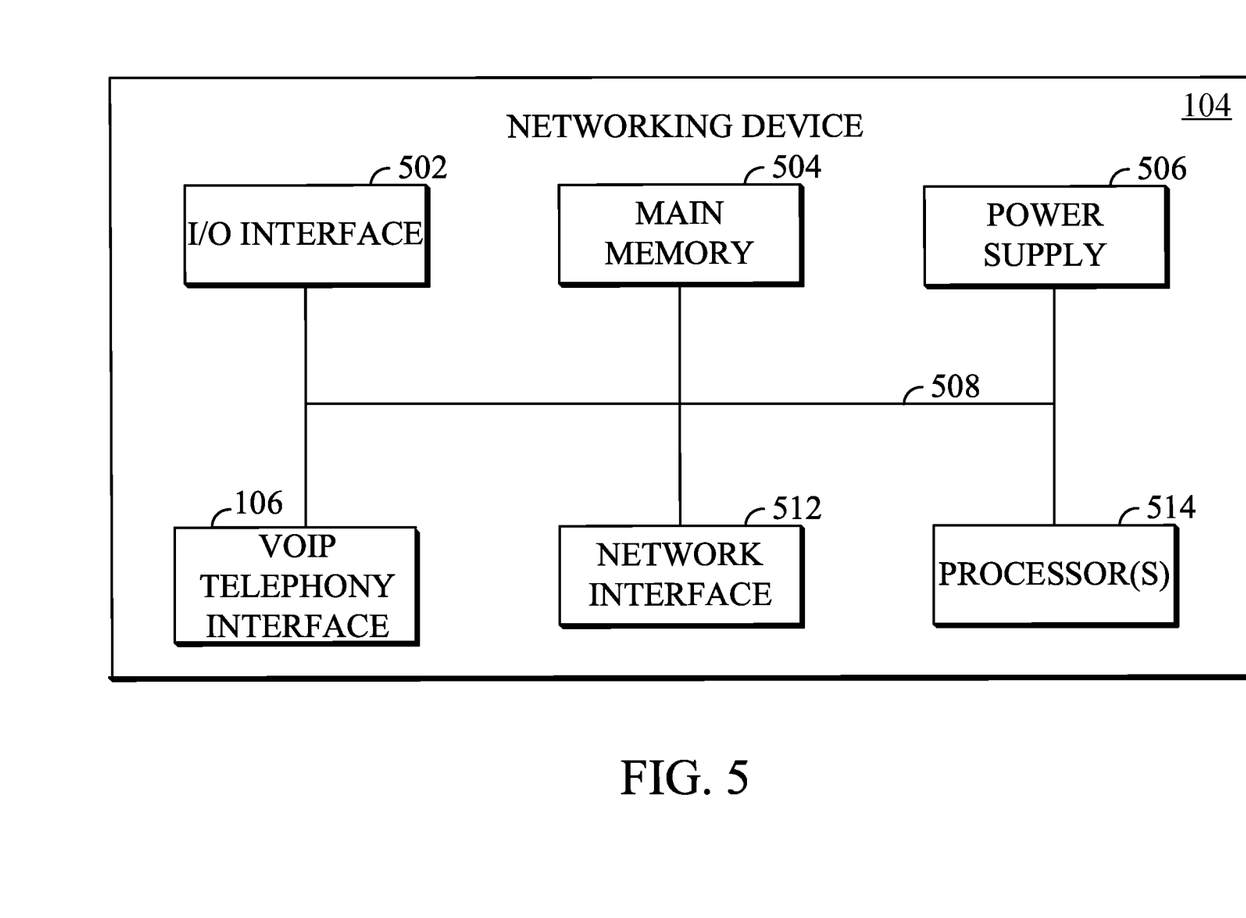
FIG. 5 illustrates a block diagram of an exemplary networking device according to an aspect of the present disclosure.

FIG. 5 is a block diagram of an exemplary implementation of the networking device 104 according to an aspect of the present disclosure. It is contemplated by the present disclosure that the networking device 104 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As illustrated in FIG. 5, the exemplary networking device 104 includes one or more memories or memory locations including a main memory 504 as well as an I/O interface 502, a power supply 506, a network interface 510, one or more processors 512, and the VOIP telephony interface 106. The main memory 504 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 504 can be used to store any type of instructions associated with algorithms, processes, or operations for controlling the general functions of the networking device 104 including the operations of software as well as any operating system, such as Linux, UNIX, Windows Server, or other customized and proprietary operating systems.

The I/O interface 502 can be an interface for enabling the transfer of information between the networking device 104 and external devices connected to the networking device 104 that need special communication links for interfacing with the one or more processors 514. The I/O interface 502 can be implemented to accommodate various connections to the networking device 104 that include, but is not limited to, a universal serial bus (USB) connection, parallel connection, a serial connection, coaxial connection, a High-Definition Multimedia Interface (HDMI) connection, or other known connection in the art connecting to external devices.

The power supply 506 can be used to power the various components of the networking device 104. The power supply 506 can be self-contained, such as a battery pack, and/or the power supply 506 can include an interface to be powered through an electrical outlet.

The network interface 510 is a software and/or hardware interface implemented to establish a connection between the networking device 104 and the external device 102 and/or a connection between the networking device 102 and the server 110 via the Internet 108 according to one or more aspects of the present disclosure described above. It is contemplated by the present disclosure that the network interface 510 includes software and/or hardware interface circuitry for establishing communication connections with the rest of the system using both wired and wireless connections for establishing connections to, for example, a local area networks (LANs), wide area networks (WANs), metropolitan area networks (MANs), personal area networks (PANs), wireless local area networks (WLANs), system area networks (SANs), and other similar networks.

The one or more processors 512 are used for controlling the general operations of the networking device 104 and the operations of the VOIP telephony interface 106 described in the present disclosure. Each one or the one or more processors 512 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the networking device 104 and the VOIP telephony interface 106.

The VOIP telephony interface 106 is a software and/or hardware interface implemented to perform the operations of the VOIP telephony interface 106 described in the present disclosure. The VOIP telephony interface 106 may be implemented using one or more components of the above-described components of the networking device 104 (e.g., 502, 504, 506, 510, and 512).

Communication between the components of the networking device 104 (e.g., 502, 504, 506, 510, 512, and 106) are established using an internal bus 508.

As described above by way of example, the present disclosure provides an technique of ensuring VOIP reliability after a networking device enters a power saving mode, thereby ensuring that a user will be able to place a voice call for emergency services using VoIP in the event of the networking device entering the power saving mode.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner.

The subject matter of the present disclosure is provided as examples of systems and method for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

The invention claimed is:

1. A networking device comprising:
a processor;
a Voice over Internet Protocol (VOIP) telephony interface configured to communicate with the processor, the VOIP telephony interface in communication with a telecommunications device that acts as a telephone to receive analog telephony signals and communicate the received analog telephony signals to the network device, wherein the VOIP telephony interface provides communication between the telecommunications device and a server of a VOIP provider via Internet to establish a voice line for communication utilizing VOIP; and
a non-transitory memory having executable instructions stored thereon, which when executed, cause the processor to perform:
causing the networking device to enter a power saving mode;
determining that the VOIP telephony interface is not in service after the causing the networking device to enter the power saving mode, the VOIP telephony interface being communicatively connected to a VOIP provider via an Internet;
rebooting the VOIP telephony interface when the VOIP telephony interface is determined not to be in service;
obtaining a configuration file that provides the VOIP telephony interface with an Internet Protocol (IP) address of the server; and
transmitting a dial tone to the telecommunications device to signify that VOIP is available and ready to be used by the VOIP telephony device.

2. The networking device according to claim 1, wherein the determining whether or not the VOIP telephony interface is in service includes obtaining an operational state of the VOIP telephony interface,
wherein when the operational state of the VOIP telephony interface indicates that the VoIP telephony interface is operational, the VOIP telephony interface is determined to be in service, and
wherein when the operational state of the VOIP telephony interface does not indicate that the VoIP telephony interface is operational, the VOIP telephony interface is determined to not be in service.

3. The networking device according to claim 1, wherein the determining whether or not the VOIP telephony interface is in service includes obtaining an operational state of the VOIP telephony interface,
wherein when the operational state of the VOIP telephony interface indicates that the VOIP telephony interface is operational, the VOIP telephony interface is determined to be in service,
wherein when the operational state of the VOIP telephony interface does not indicate that the VOIP telephony interface is operational and when the determining of whether or not the VOIP telephony interface is in service has been performed less than a predetermined number of times, the determining of whether or not the VOIP telephony interface is in service is repeated, and
wherein when the operational state of the VOIP telephony interface does not indicate that the VOIP telephony interface is operational and when the determining of whether or not the VOIP telephony interface is in service has been performed a predetermined number of times, the VOIP telephony interface is determined to not be in service.

4. The networking device according to claim 1, wherein the processor causes the networking device to enter the power saving mode when (i) power supplied to the networking device is interrupted or (ii) data traffic of the networking device is below a threshold for a predetermined amount of time.

5. The networking device according to claim 1, wherein the rebooting the VOIP telephony interface includes obtaining an IP address of the server of the VOIP provider and transmitting a registration request to the server of the VOIP provider.

6. The networking device according to claim 1, wherein the processor further performs notifying the telecommunications device that the VOIP telephony interface is in service when the VOIP telephony interface is determined to be in service, the telecommunications device being connected to the networking device.

7. The networking device according to claim 1, wherein the processor further performs notifying the telecommunications device that the VOIP telephony interface is in service after rebooting the VOIP telephony interface, the telecommunications device being connected to the networking device.

8. The networking device according to claim 1, while in the power saving mode, the networking device only operates a single transmit channel for transmitting data and a single receive channel for receiving data.

9. The networking device according to claim 8, wherein the single transmit channel for transmitting data and the single receive channel for receiving data are reserved for data transmission and reception for the VOIP telephony interface.

10. A method comprising:
causing a networking device to enter a power saving mode;
determining that a Voice over Internet Protocol (VOIP) telephony interface is not in service after the causing the networking device to enter the power saving mode, the networking device including the VOIP telephony interface, the VOIP telephony interface communicatively connected to a VOIP provider via an Internet, the VOIP telephony interface in communication with a telecommunications device that acts as a telephone to receive analog telephony signals and communicate the received analog telephony signals to the network device, wherein the VOIP telephony interface provides communication between the telecommunications device and a server of a VOIP provider via Internet to establish a voice line for communication utilizing VOIP;
rebooting the networking device when the VOIP telephony interface is determined not to be in service;
obtaining a configuration file that provides the VOIP telephony interface with an Internet Protocol (IP) address of the server; and
transmitting a dial tone to the telecommunications device to signify that VOIP is available and ready to be used by the VOIP telephony interface.

11. The method according to claim 10, wherein the determining whether or not the VOIP telephony interface is in service includes obtaining an operational state of the VOIP telephony interface,
wherein when the operational state of the VOIP telephony interface indicates that the VoIP telephony interface is operational, the VOIP telephony interface is determined to be in service, and
wherein when the operational state of the VOIP telephony interface does not indicate that the VoIP telephony interface is operational, the VOIP telephony interface is determined to not be in service.

12. The method according to claim 10, wherein the determining whether or not the VOIP telephony interface is in service includes obtaining an operational state of the VOIP telephony interface,
wherein when the operational state of the VOIP telephony interface indicates that the VOIP telephony interface is operational, the VOIP telephony interface is determined to be in service,
wherein when the operational state of the VOIP telephony interface does not indicate that the VOIP telephony interface is operational and when the determining of whether or not the VOIP telephony interface is in service has been performed less than a predetermined number of times, the determining of whether or not the VOIP telephony interface is in service is repeated, and
wherein when the operational state of the VOIP telephony interface does not indicate that the VOIP telephony interface is operational and when the determining of whether or not the VOIP telephony interface is in service has been performed a predetermined number of times, the VOIP telephony interface is determined to not be in service.

13. The method according to claim 10, wherein the causing the networking device to enter the power saving mode is performed when (i) power supplied to the networking device is interrupted or (ii) data traffic of the networking device is below a threshold for a predetermined amount of time.

14. The method according to claim 10, wherein the rebooting the VOIP telephony interface includes obtaining an IP address of the server of the VOIP provider and transmitting a registration request to the server of the VOIP provider.

15. The method according to claim 10, further comprising notifying the telecommunications device that the VOIP telephony interface is in service when the VOIP telephony interface is determined to be in service, the telecommunications device being connected to the networking device.

16. The method according to claim 10, further comprising notifying the telecommunications device that the VOIP telephony interface is in service after rebooting the VOIP telephony interface, the telecommunications device being connected to the networking device.

17. The method according to claim 10, while in the power saving mode, the networking device only operates a single transmit channel for transmitting data and a single receive channel for receiving data.

18. The method according to claim 17, wherein the single transmit channel for transmitting data and the single receive channel for receiving data are reserved for data transmission and reception for the VOIP telephony interface.

19. A non-transitory computer readable recording medium having stored thereon executable instructions, which when executed, cause a processor to perform the following:
causing a networking device to enter a power saving mode;
determining that a Voice over Internet Protocol (VOIP) telephony interface is not in service after the causing the networking device to enter the power saving mode, the networking device including the VOIP telephony interface, the VOIP telephony interface communicatively connected to a VOIP provider via an Internet, the VOIP telephony interface in communication with a telecommunications device that acts as a telephone to receive analog telephony signals and communicate the received analog telephony signals to the network device, wherein the VOIP telephony interface provides communication between the telecommunications device and a server of a VOIP provider via Internet to establish a voice line for communication utilizing VOIP;
rebooting the networking device when the VOIP telephony interface is determined not to be in service;
obtaining a configuration file that provides the VOIP telephony interface with an Internet Protocol (IP) address of the server; and
transmitting a dial tone to the telecommunications device to signify that VOIP is available and ready to be used by the VOIP telephony interface.

* * * * *